United States Patent [19]
Bunyan

[11] 3,746,470
[45] July 17, 1973

[54] MOUNTING OF PROPELLERS ON SHAFTS
[75] Inventor: Thomas Walter Bunyan, London S.E. 10, England
[73] Assignee: Pilgrim, P & O Valve Limited, London, England
[22] Filed: Apr. 5, 1971
[21] Appl. No.: 131,072

Related U.S. Application Data
[63] Continuation-in-part of Ser. No. 802,904, Feb. 27, 1969, Pat. No. 3,577,628.

[52] U.S. Cl.................. 416/244, 416/146, 416/241
[51] Int. Cl............................................. B23k 31/02
[58] Field of Search.................. 416/244, 146, 241, 416/241 A, 93 M, 213, 204

[56] References Cited
UNITED STATES PATENTS

| | | | |
|---|---|---|---|
| 2,892,503 | 6/1959 | Hood et al. | 416/244 X |
| 3,032,864 | 5/1962 | Webb | 29/156.8 B |
| 3,228,482 | 1/1966 | Bunyan | 416/244 |
| 3,358,772 | 12/1967 | Bunyan | 416/204 |
| 3,469,556 | 9/1969 | Campbell et al. | 416/129 |
| 3,549,275 | 12/1970 | Laskey | 416/244 X |

FOREIGN PATENTS OR APPLICATIONS

| | | | |
|---|---|---|---|
| 254,599 | 12/1962 | Australia | 416/244 |
| 616,293 | 10/1926 | France | 416/244 |

Primary Examiner—Everette A. Powell, Jr.
Attorney—Woodcock, Kurtz & Mackiewicz

[57] ABSTRACT

A method of mounting a propeller on a tapered portion of a shaft in torque and thrust transmitting connection therewith. The propeller is supported in a horizontal position and an internally tapered metallic sleeve is lowered into a bore in passing axially through the centre of the hub of the propeller. The outside diameter of the sleeve is less than the inside diameter of the bore so that there is an annular space between the bore and the sleeve. O ring seals are placed between the bore and the sleeve at each end of the sleeve to close the annular space and junk rings are placed over the O ring seals to locate the sleeve centrally in the bore. A cold setting composition is pumped into the annular space and held under pressure until it has set. The sleeve is then force-fitted onto the tapered portion of the shaft.

14 Claims, 9 Drawing Figures

MOUNTING OF PROPELLERS ON SHAFTS

The present application is a continuation-in-part of my parent application Ser. No. 802,904 filed Feb. 27, 1969 and issued May 4, 1971 as U.S. Pat. No. 3,577,628.

The present invention relates to the mounting of propellers on shafts and particularly to the mounting of keyless bore propellers on shafts. Keyless bore propellers have been developed with the object of avoiding the effects of stress concentration at the key and keyway and thereby increasing the fatigue resistance of a tailshaft significantly under normal operating conditions. It is expected that the Classification Authorities will extend the present 4 year period between tailshaft surveys.

Because the key has been omitted, the drive between tailshaft and the propeller must be achieved by friction alone. The Classification Authorities require a factor of safety against slipping of 2.7 times the maximum full load torque of the engine for ahead operation and 2.2 for astern operation (without the propeller nut) in sea water at 35°C. To meet this requirement there must be a much greater interference grip between shaft and propeller than is the case with a keyed propeller mounting, which means that unless a high coefficient of friction is achieved between the shaft and the boss, the stresses in the boss will be very high to achieve the necessary grip, and in particular there will be a concentration of stress at the critical position at the forward end of the propeller boss. Propeller bosses are already highly stressed due to the effects of differential thermal contraction during cooling down of the propeller from the casting temperature. Addition applied stresses must therefore be kept small.

It has already been proposed to secure a cast iron sleeve permanently within the propeller hub and achieve high friction coefficients by degreasing the surfaces of the bore of the sleeve and tailshaft before dry fitting the sleeve on the tailshaft. Under these conditions measurements of the push-up travel and load can be used to check the actual factor of safety present between propeller and shaft. A push-up curve may be provided for each propeller giving the push-up load and corresponding distance for a range of ambient temperatures at which the propeller may be fitted. This enables the fitter to ensure that the factor of safety at say 35°C will be in accordance with Classification requirements.

It is an object of the present invention to provide an improved assembly of a propeller on a shaft and an improved method of mounting the propeller of the shaft.

According to the present invention in one aspect there is provided a method of mounting a propeller on a tapered portion of a shaft in torque and thrust transmitting connection therewith, the propeller having a bore extending axially through its hub, including the steps of locating an internally tapered metallic sleeve in the bore with an annular space between the sleeve and the bore, closing the ends of the annular space, filling the annular space with a hardenable or cold setting composition, holding the composition at a pressure greater than atmospheric pressure until it sets, and force-fitting the sleeve onto the tapered portion of the shaft. The highly accurate bedding of the external surface of the sleeve with the bore of the hub which was required for the force fitting of the sleeve in the hub in known propeller mountings is thus avoided.

According to the present invention in another aspect there is provided an assembly of a propeller on a tapered portion of a shaft in which an internally tapered metallic sleeve is located in a bore extending axially through the hub of the propeller and is force-fitted on the tapered portion of the shaft so as to be in torque and thrust transmitting connection therewith, a layer of hardenable or cold-setting composition set under greater than atmospheric pressure being disposed between the sleeve and the bore so as to provide a torque and thrust transmitting connection therebetween.

An embodiment of the invention will now be described, by way of example, with reference to the accompanying drawings of which:

Figure 4:
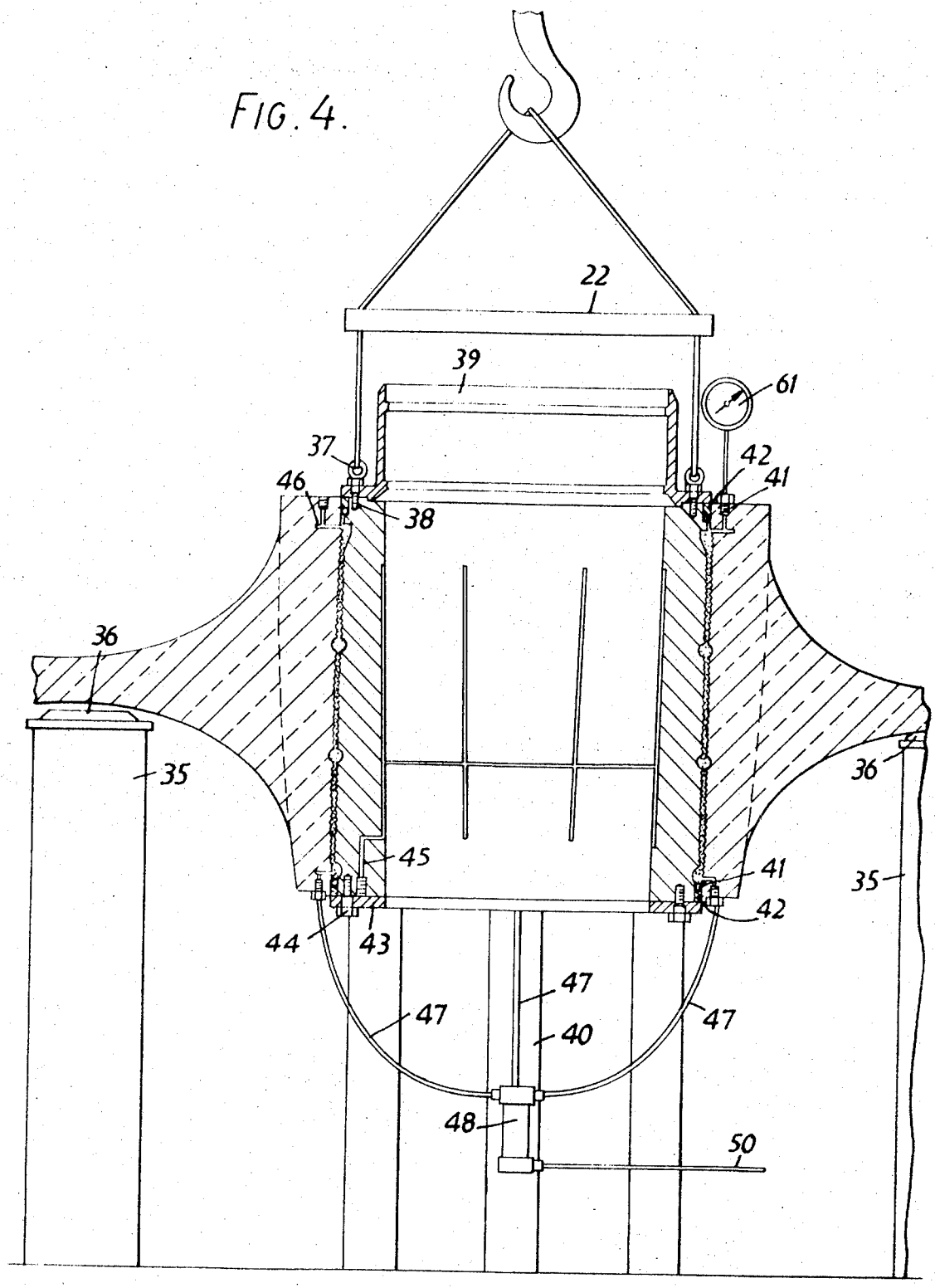
Figure 5:
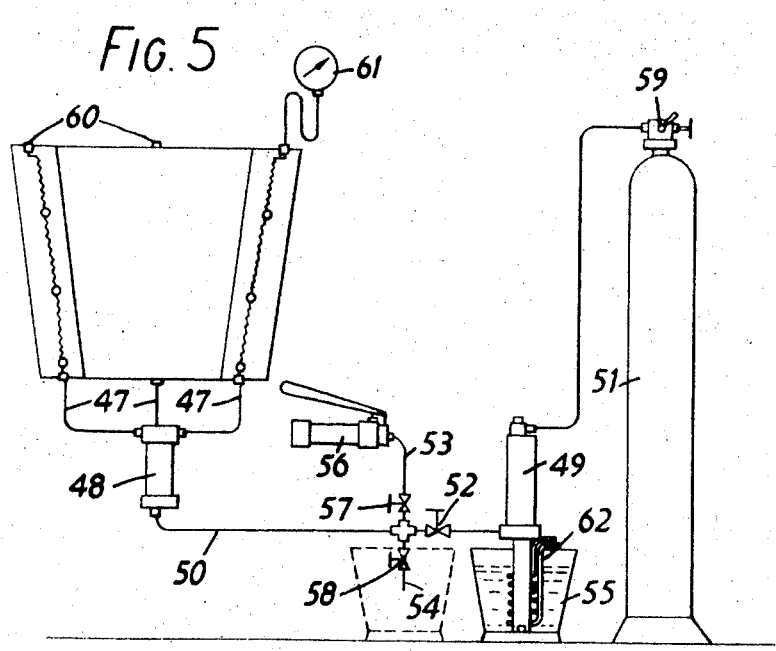
Figure 6:
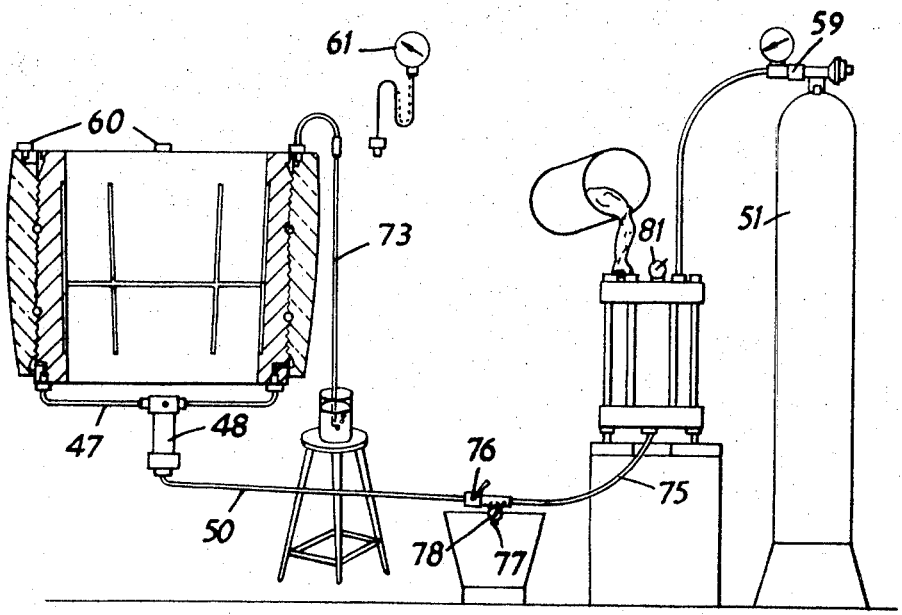
Figure 7:
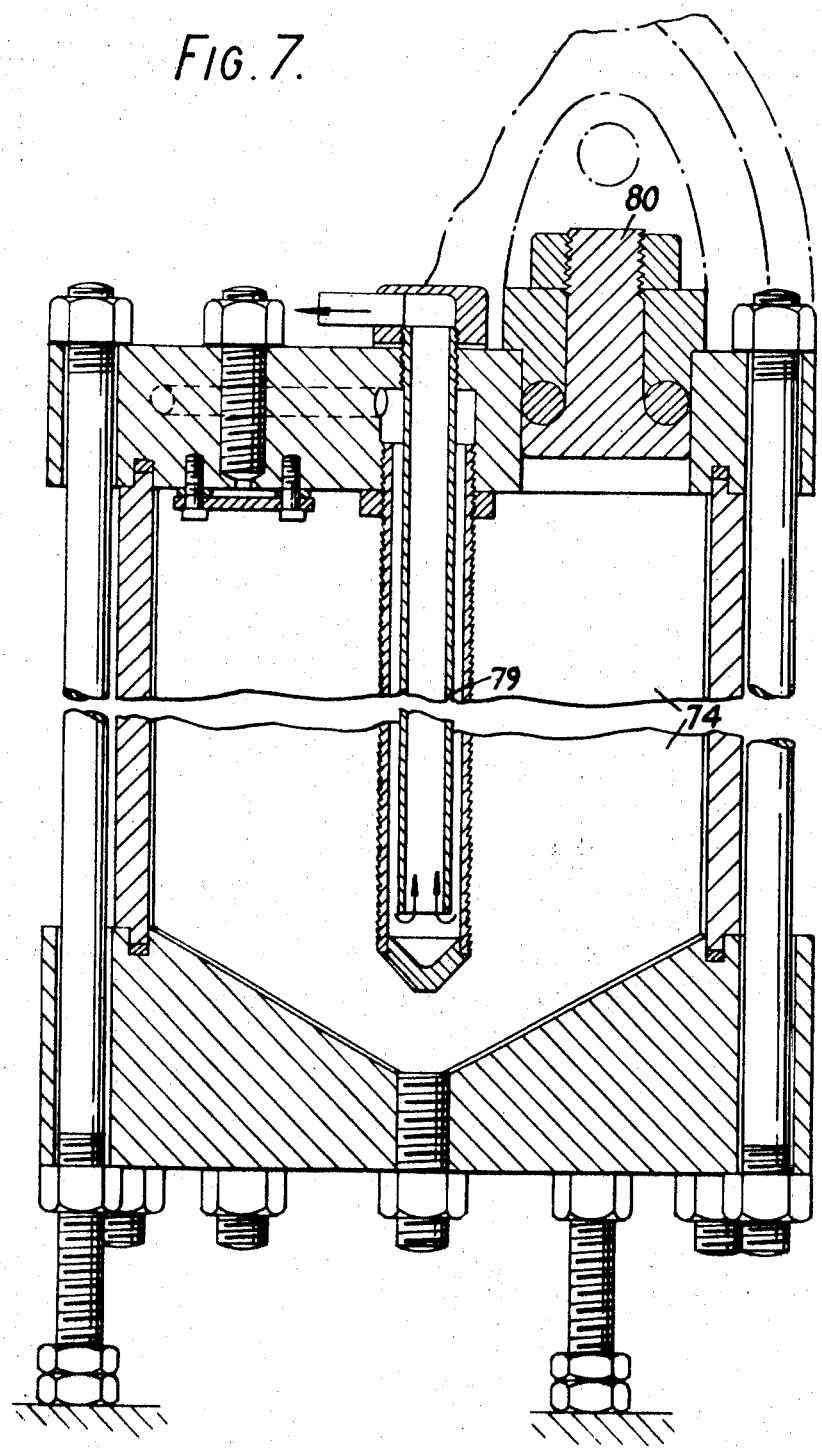

FIGS. 3 a b and c show the sleeve being bedded on the tailshaft;

FIG. 4 shows the sleeve located in the bore of the propeller hub in preparation for the injection of the cold setting composition;

FIG. 5 shows the apparatus for filling the annular space between the sleeve and the bore with the resin composition;

FIG. 6 shows an alternative apparatus for filling the annular space with the resin composition;

FIG. 7 shows the pressure chamber of FIG. 6.

Referring to the drawings, a propeller shaft 10 has a tapered portion 11 at its rear end. A bronze propeller 12 has a hub 13 with an axially-extending bore 14 passing through it. A sleeve 15 is cast from nodular cast iron or pearlitic cast iron. The sleeve 15 has a tapered bore 16 which fits the tapered portion 11 of the shaft. Its outer surface is screw threaded with portions 17 and 18 of opposite hand to provide circumferentially extending grooves. The bore of the hub is similarly provided with screw threaded portions 19 and 20 of opposite hand. The bore and the outer surface of the sleeve are cylindrical, the inside diameter of the bore being 2 mm greater than the outside diameter of the sleeve. Both the sleeve and hub are machine finished.

Figure 3A:
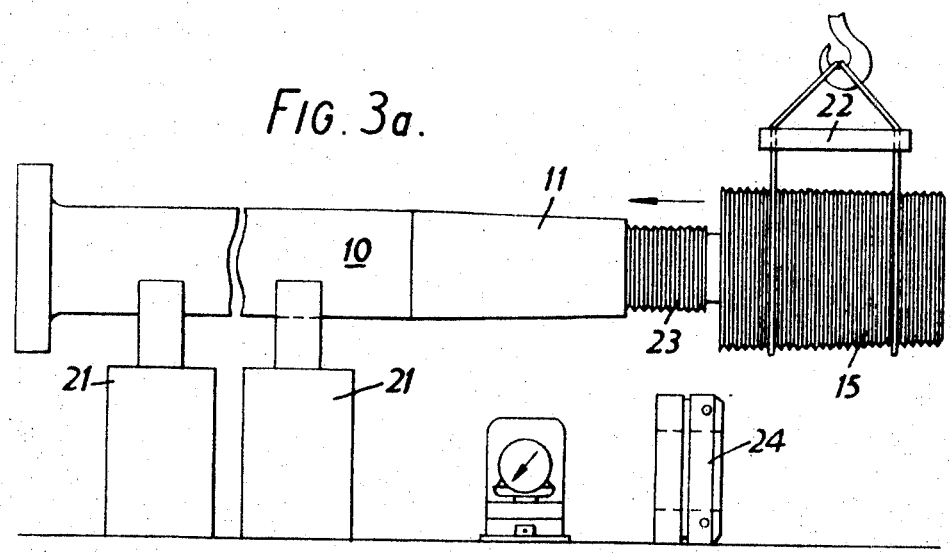
Figure 3B:
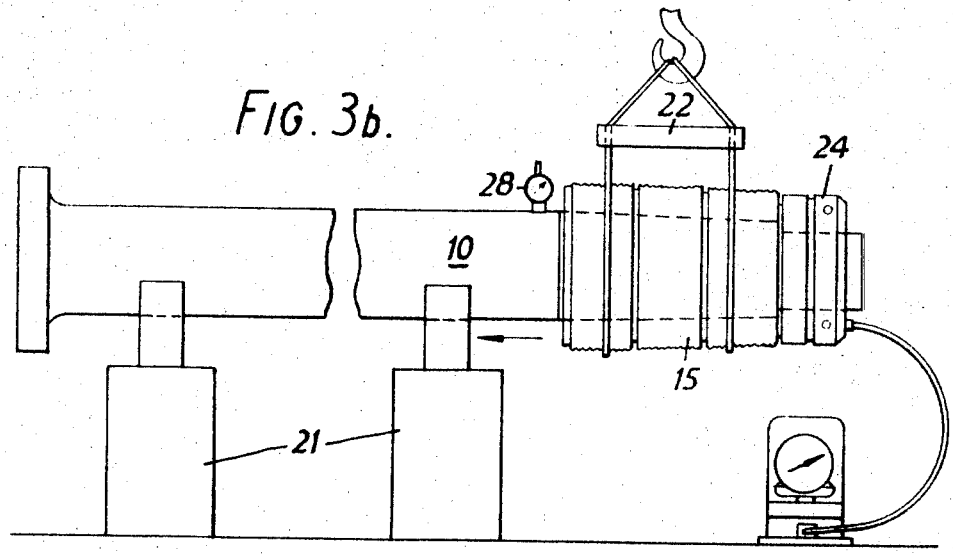
Figure 3C:
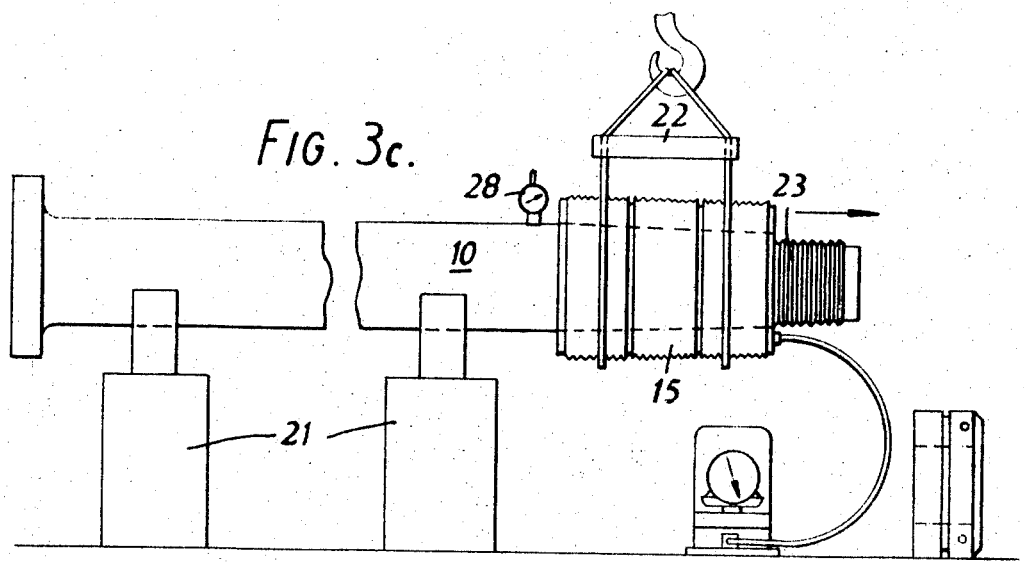

The sleeve is first bedded on the tapered portion of the shaft. This operation is shown in FIGS. 3a, 3b and 3c.

The shaft 10 is supported in a horizontal position on two "Vee" block stands 21. The tapered portion 11 and the tapered bore 16 of the sleeve are given a 7 micron finish by hand rubbing with 100 grit emery cloth and a well distributed bedding contact of approximately 60 percent of the area is achieved. After thoroughly degreasing the portion 11 and the bore 16 with carbon tetrachloride, the sleeve 15, carried by a crane hook and sling 22, is slid onto the end of the shaft 10.

The rearmost part of the shaft 10 has a screw-threaded portion 23. When the sleeve 15 has been slid onto the tapered portion an hydraulically-jacked nut 24 is threaded on the screw-threaded portion 23.

Figure 1:
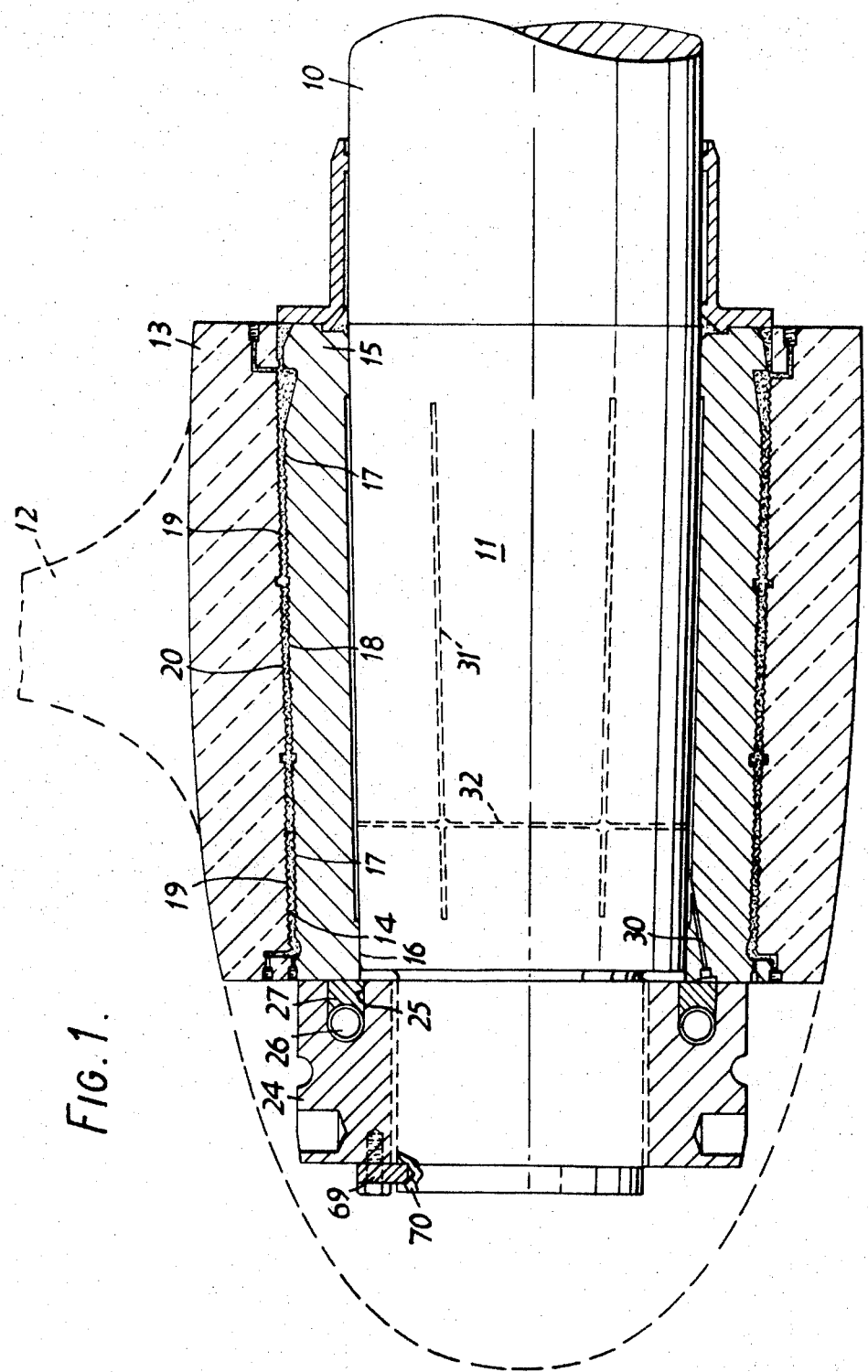
FIG. 1 shows an assembly of a propeller on a tailshaft.
Figure 2:
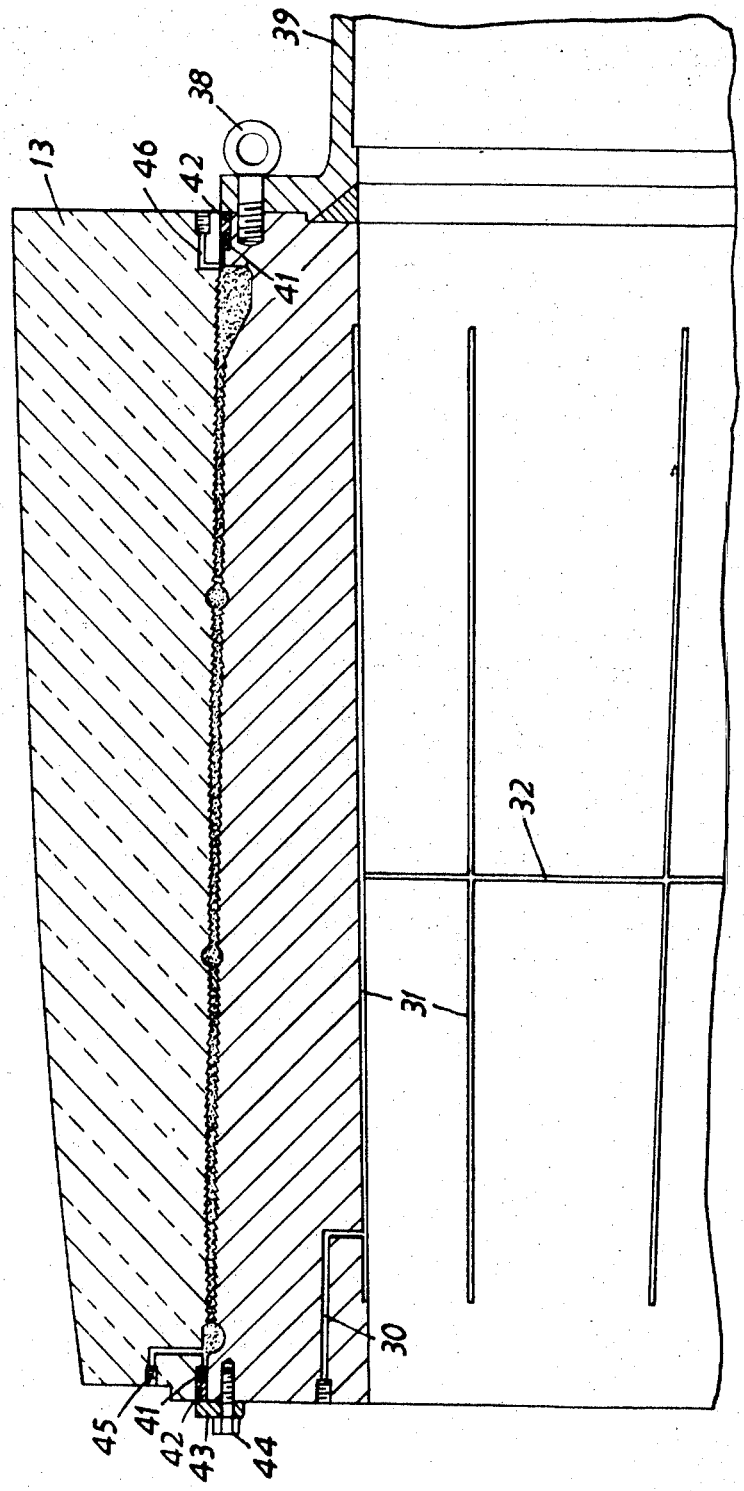
FIG. 2 shows a detail of the hub and sleeve.

As can be seen from FIG. 1, the nut has an annular cavity 25 in one end into which a hollow rubber ring 25 is fitted. An annular piston 27 is fitted into the cavity over the rubber ring. Hydraulic fluid can be pumped into the rubber ring through a conduit in the nut (not shown) to cause the piston to be moved so as to project beyond the end of the nut.

The nut is screwed onto the shaft until the piston-bearing end engages the end of the sleeve. Hydraulic fluid is pumped into the rubber ring 26 and the piston 27 pushes the sleeve 15 up the tapered portion 11. A dial indicator 28 fitted to the shaft 10 measures the travel of the sleeve up the shaft which must not exceed a calculated value.

When the travel of the sleeve up the shaft has reached the required value the pressure is released and the nut 24 is unscrewed. The hydraulic pump 29 is degreased with carbon tetrachloride and then connected to a conduit 30 in the sleeve which communicates with an array of longitudinal channels 31 interconnected by a circumferential channel 32 in the bore of the sleeve 15. Water is pumped into the channels 31 and 32 to a pressure of about 4,000 p.s.i. The pressure is held to give the water time to seep between the groove. After above 5 minutes the sleeve will be jacked off the shaft by the water pressure. By using water rather than oil a high friction coefficient between sleeve and shaft is obtained. The bedding contact of the shaft is thus improved to 75 percent of the area.

The 7 micron finish is reapplied to the shaft and the bore 16 and they are then degreased. The whole process is repeated to produce a bedding contact of about 85 percent. The sleeve is now ready for location in the bore of the propeller hub.

FIG. 4 shows the arrangement for locating the sleeve 15 in the bore 14 of the propeller's hub. The propeller 12 is mounted horizontally on blocks 35 with packing 36 as shown and is finally levelled off using a spirit level. The bore 14 of the hub and the outer surface of the sleeve 15 are carefully degreased with carbon tetrachloride. All holes and channels are blown out with air. The sleeve 15, slung from eye-bolts 37 screwed into tapped holes 38, which are provided for securing a flanged sleeve 39, is lowered on to packing 40 such that the end faces of sleeve and hub are flush and level. The sling is retained in place for safety.

The annular space between the sleeve 15 and the bore 14 is closed by O ring seals 41 which are fitted at both ends of the sleeve. The O ring seals are made from 6 mm diameter nitrile rubber cord cut to the peripheral length of the sleeve +5 mm to allow a tapered lap joint to be made with cement. Junk rings 42 are fitted over the O rings accurately to locate the sleeve centrally of the bore 14. The junk rings are rolled into a circular shape from 20 mm × 6 mm thick bright mild steel bar, the ends of the bar being a butting fit. The lower junk ring is held in position by means of a clamping ring 43 secured to the sleeve by screws 44.

The annular space between the sleeve and the bore of the hub is now ready for filling. For this purpose four bleed holes 45 and 46 are provided at each end of the hub connecting the annular space to the exterior. Steel pipes 47 from a distribution chamber 48 are connected to the four holes 45 at the lower end of the hub.

In the arrangement of FIG. 5, the pressure side of a pneumatically operated ram pump 49 is connected through a valve 52 to the distribution chamber by a steel pipe 50. A bottle 51 of air or nitrogen at 2,000 p.s.i. with a valve 59 is connected to the pump 49 for operating the pump. The intake of the pump is placed in a bucket 55 for receiving the resin composition.

Between the valve 52 and the distribution chamber 48, two branch pipes 53 and 54 are connected to the pipe 50. The pipe 53 is connected to a grease gun 56 and includes a valve 57. The pipe 54 constitutes a drain pipe and has a drain valve 58.

Before filling with the composition the volume of the annular space and the filling apparatus is determined. This can be done as follows.

The valves 52, 57, 58 and 59 are closed. The bucket 55 is filled with carbon tetrachloride and the valves 52 and 59 are opened so as to allow the pump to pump the carbon tetrachloride slowly into the annular space. As the bucket is emptied it is refilled with carbon tetrachloride and pumping continues until carbon tetrachloride emerges from the bleed holes 46 at the upper end of the hub. Pumping is stopped and all the bleed holes 46 save one are closed with plugs 60. The one remaining air hole is fitted with a pressure gauge 61. The pumping is restarted to bring the pressure to 500 p.s.i. as indicated on the pressure gauge 61. This pressure is held to check for leaks, the valves 52 being closed.

The bucket 55 is removed and emptied and placed under the drain pipe 54. The valve 58 is opened slowly allowing the carbon tetrachloride from the annular space to empty into the bucket. More than one bucket may be needed to receive the carbon tetrachloride. Finally the plugs and the pressure gauge are removed from the bleed hole 46 and the pump is operated with the valve 52 open so that all the carbon tetrachloride in the apparatus is drained into the buckets. The volume of the carbon tetrachloride in the buckets is measured.

Prior to filling with the composition, air or nitrogen from another bottle is blown down the bleed holes until no trace of carbon tetrachloride remains.

A synthetic resin composition is preferred for the cold setting composition. In particular the epoxide resin adhesive sold under the Registered Trade Mark "Araldite" has been found to be suitable. Grade SW404 resin and SW404C or SW404S hardener is used.

When everything is ready, the required amount of Araldite and hardener is mixed. An excess of say 1 Kg is allowed for wastage. The Araldite must be mixed quickly in order that the filling operation may be completed before the Araldite starts to set.

With the valves 59, 52, 57 and 58 closed and the plugs 60 and the pressure gauge 61 removed, bucket 55 is filled with a measured quantity of Araldite and hardener mixture. A coil 62 with cold water flowing through it, may be placed in the bucket 55 to retard setting in tropical climates. The valves 59 and 52 are opened and the Araldite is pumped into the annular space. As the bucket is emptied of Araldite it is refilled with Araldite from another measured bucket. When Araldite emerges from the bleed holes 46 the valves 59 and 52 are closed and the plugs 60 and the pressure gauge 61 are inserted in the holes 46. The valve 57 is then opened and the grease gun 56 is operated to raise the pressure to 500 p.s.i. This pressure is held until the Araldite has set.

As soon as the pressure of 500 p.s.i. is reached by means of the grease gun, the pump 49 is uncoupled. The suction intake of the pump is placed in a bucket of carbon tetrachloride and the pump is operated to flush the Araldite out of the pump before it sets. The grease in the grease gun prevents Araldite entering it and therefore it does not have to be cleaned. The pipes 47, 50, 53 and 54, the valves 52, 57 and 58 and the distribution chamber 48 cannot be used again.

Before filling, samples of Araldite are taken and tested for strength. This may conveniently be done by securing a bolt with ½ inch Whitworth thread in a nut with ¾ inch Whitworth thread by means of the Araldite. When the Araldite is cured the assembly is set up in a compression testing machine and loaded until failure. The minimum failure load permissible is 2.5 tons. A check sample is drawn off during filling.

The propeller and sleeve is left undistrubed for 24 hours and is then ready for mounting on the shaft. The clamping ring 43 and the junk rings are removed. A push-up test is performed as described with reference to FIG. 3 to check the bedding contact. The propeller and sleeve are then pushed onto the shaft for the last time using the hydraulically jacked nut 24. When the propeller has been pushed on the required amount the hydraulic fluid is bled from the rubber ring and the nut is screwed up tight. Two locking plates 69 are bolted to the nut 24 to lock it in position.

As the factor of safety of the Araldite connection is so large, i.e. over 50 times the shear stress between the sleeve and the hub produced by the maximum continuous full load torque, a small amount of distributed air bubbles will be of no consequence. Further, as the joint efficiency is not dependent on the filling pressure, a variation in the filling pressure will also be of no consequence. The SW404 Araldite is not chosen for its adhesive properties but for its remarkable long term stability, high crushing and shear strength, high friction coefficient and high impact resistance.

FIGS. 6 and 7 show an alternative apparatus for filling the annular space with Araldite.

A flow indicator 73 is connected to one of the bleed holes 46. The plugs 60 are fitted to the other bleed holes. A pressure chamber 74 is connected to the pipe 50 at its lower end through a pipe 75 and a valve 76. Between the valve 75 and the pressure chamber the pipe 75 has a branch pipe 77 which constitutes a drain pipe and has a valve 78. A bucket is located beneath the drain pipe 77. The pressure chamber is connected to the bottle 51 at its upper end.

The pressure chamber has a water cooling system 79 and a filling hole 80 which can be hermetically closed.

The pressure chamber 74 is filled with carbon tetrachloride through the filling hole 80, the level of carbon tetrachloride is "dipped" before closing 80. The valves 59 and 76 are opened and the carbon tetrachloride fills the annular space between the propeller hub and the sleeve. When the carbon tetrachloride floods into the flow indicator the valve 76 is closed and the flow indicator and plugs are removed from the bleed holes. The valve 76 is then opened to top up the annular space without trapping any air. The valve 76 is then closed. The plugs 60 are replaced and the pressure gauge 61 is fitted in the fourth bleed hole 46. The valves 59 and 76 are opened to raise the pressure to 500 p.s.i. The hub is inspected for leaks. If there are none, the valves 59 and 76 are closed and a valve 81 is opened to release the pressure in the pressure chamber. By taking dip measurements of the depth of carbon tetrachloride in the pressure chamber, the volume of Araldite required can be calculated. An extra amount of Araldite is allowed for wastage.

The plugs and pressure gauge are removed and the valve 78 is opened to allow the carbon tetrachloride to drain into the bucket. Using another bottle of compressed air or nitrogen, the carbon tetrachloride is blown down through the bleed holes 46 until no smell emerges from the drain pipe 77.

To fill the annular space with Araldite, the required amount of Araldite and hardener mixture as given by the "dip" measurements is poured into the pressure chamber through the filling hole, which is "dipped" and then closed. The plugs 60 and flow indicator 73 are inserted in the bleed holes 46. The annular space is filled with Araldite by performing the same operations that were performed to fill it with carbon tetrachloride. When the annular space has been filled and brought to the required pressure the valve 76 is closed and the pressure chamber is depressurized by opening 81 and is then topped up with carbon tetrachloride and repressurized the pressure being maintained for 24 hours.

Mounting a ship's propeller in this way has several advantages. The propeller hub is insulated from the shaft and therefore from the ship, which under certain circumstances is an advantage. Alternatively a soft copper earthing ring may be peened into the gap left by the removal of the junk ring at the rear end of the propeller hub. This ring effectively earths the propeller to the ship via the shaft and the bearings.

The joint between the propeller hub and the sleeve is some 30 times stronger than the force-fitted connection. It also enables the stresses in the hub to be reduced. Because of the reduction in these stresses, the thickness of the sleeve can safely be increased and the hub thickness decreased up to the limit of hub thickness necessary for rigidity at the propeller blade roots. Since cast iron is less dense than bronze this results in a decrease in the propeller weight and since bronze is many times more expensive than cast iron there is a saving in cost.

The layer of synthetic resin also provides improved damping of wake-excited propeller blade vibrations. By using a layer of Araldite which has been injected and set at a uniform pressure to join the sleeve and the propeller hub no distortion occurs in the bore of the sleeve where this has been carefully bedded to the shaft before assembly in the propeller boss.

What is claimed is:

1. A method of mounting a propeller on a tapered portion of a shaft in torque and thrust transmitting connection therewith, the propeller having a bore extending axially through its hub, including the steps of providing the outer surface of an internally tapered metallic sleeve with circumferentially extending grooves, providing the bore of the hub with circumferentially extending grooves, locating the sleeve in the bore with an annular space between the sleeve and the bore, closing the ends of the annular space, filling the annular space with a hardenable or cold-setting composition, holding the composition at a pressure greater than atmospheric pressure until it sets, and force-fitting the sleeve onto the tapered portion of the shaft.

2. A method according to claim 1 in which the composition includes an epoxide resin.

3. A method according to claim 1 in which the propeller is positioned horizontal during the locating of the sleeve and the filling of the annular space with the composition.

4. A method according to claim 1 in which the grooves are formed on the outer surface of the sleeve and the bore of the hub by cutting screw threads on their respective surfaces.

5. A method according to claim 1 in which holes are provided in at least one of the sleeve and the hub to connect the annular space formed therebetween to the outside at both ends thereof, the composition is pumped into the annular space through the holes at one end thereof until it emerges through the holes at the other end thereof whereupon the holes at the said other end are closed and the composition is brought to the said pressure greater than atmospheric pressure.

6. A method according to claim 5 in which the composition is pumped into the annular space through the holes at the lower end of the annular space.

7. A method according to claim 1 in which the sleeve is bedded onto the shaft prior to its location in the bore.

8. An assembly comprising a propeller having a hub and a bore extending axially through the hub the bore having circumferentially extending grooves in its surface; a shaft having a tapered portion; an internally tapered metallic sleeve located in the bore extending axially through the hub, the sleeve having circumferentially extending grooves in its outer surface and being force-fitted on the tapered portion of the shaft so as to be in torque and thrust transmitting connection therewith, a layer of hardenable or cold-setting composition between the sleeve and the bore set under greater than atmospheric pressure so as to provde a torque and thrust transmitting connection therebetween.

9. An assembly according to claim 8 in which the composition includes an epoxide resin.

10. An assembly according to claim 8 in which the sleeve is externally screw threaded to provide the circumferentially extending grooves.

11. An assembly according to claim 8 in which the bore is internally screw threaded to provide the circumferentially-extending grooves.

12. An assembly according to claim 8 including channels formed in the interface between the sleeve and the tapered portion of the shaft and means to connect the channels to a supply of fluid under pressure for removing the sleeve from the shaft.

13. An assembly according to claim 12 in which the channels include channels extending longitudinally of the shaft and at least one channel extending circumferentially of the shaft and interconnecting the longitudinally extending channels.

14. An assembly according to claim 8 in which the hub is electrically insulated from the propeller shaft by virtue of the insulating properties of the composition.

* * * * *